Feb. 8, 1944.                G. C. BRUEN                2,340,862
                              CARD FILE
                         Filed Aug. 8, 1942            6 Sheets-Sheet 1
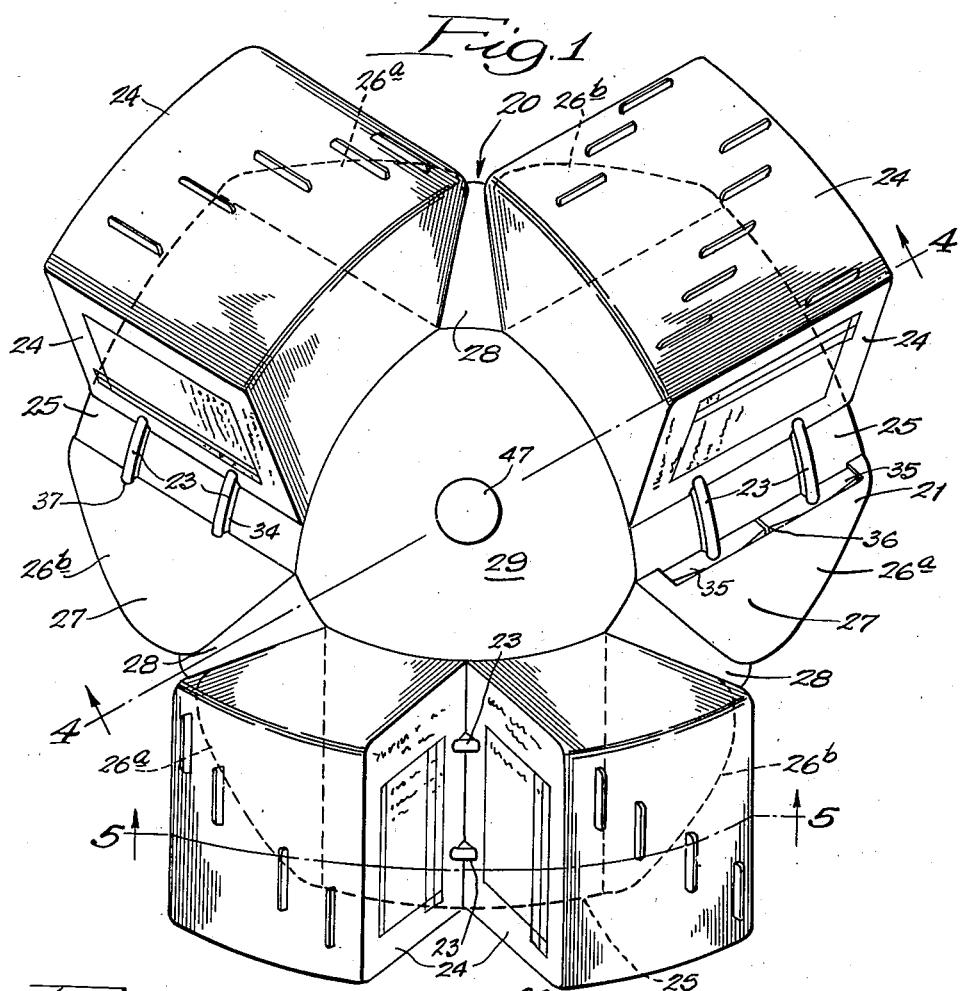
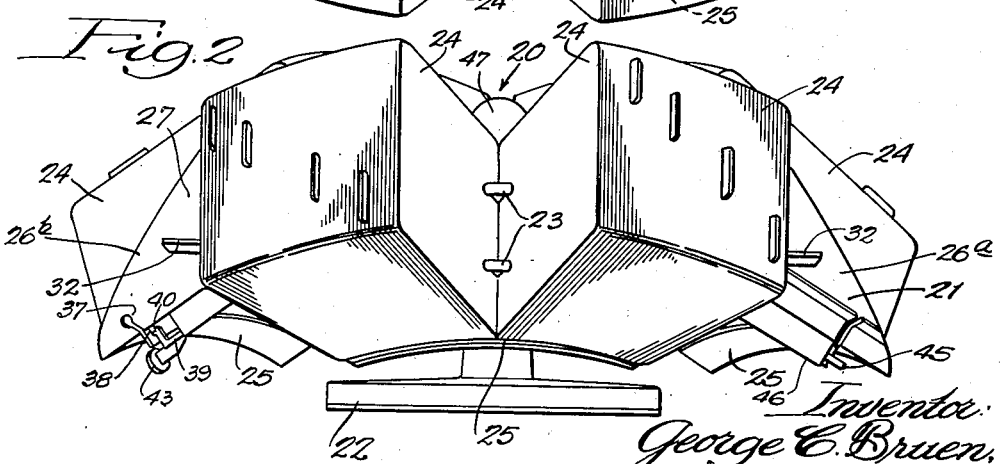

Feb. 8, 1944. G. C. BRUEN 2,340,862
CARD FILE
Filed Aug. 8, 1942 6 Sheets-Sheet 2
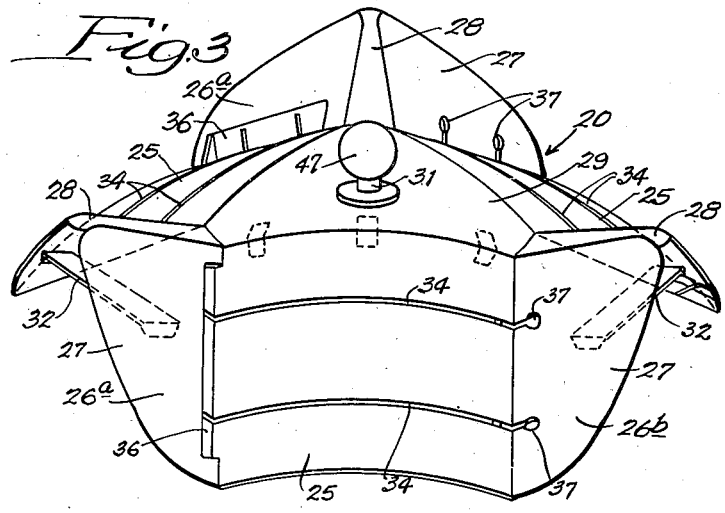
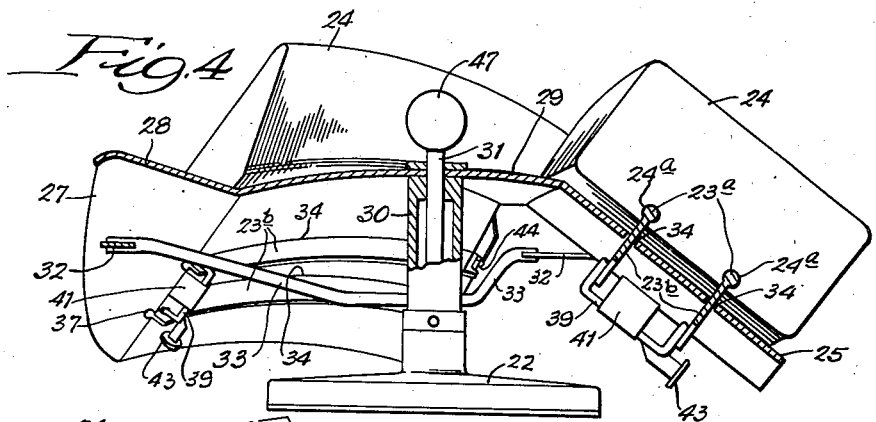
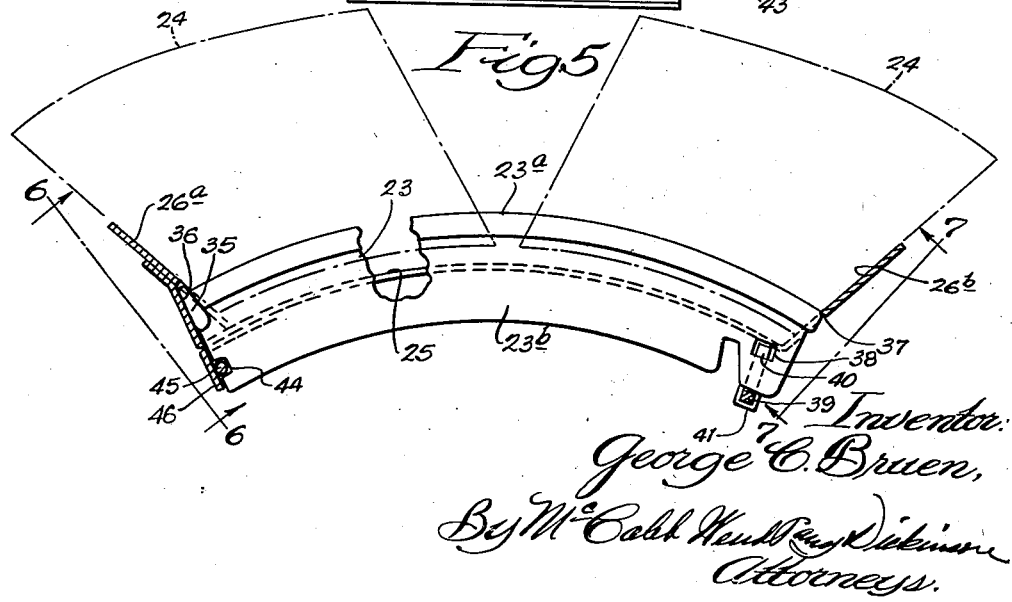

Feb. 8, 1944.  G. C. BRUEN  2,340,862
CARD FILE
Filed Aug. 8, 1942  6 Sheets-Sheet 3
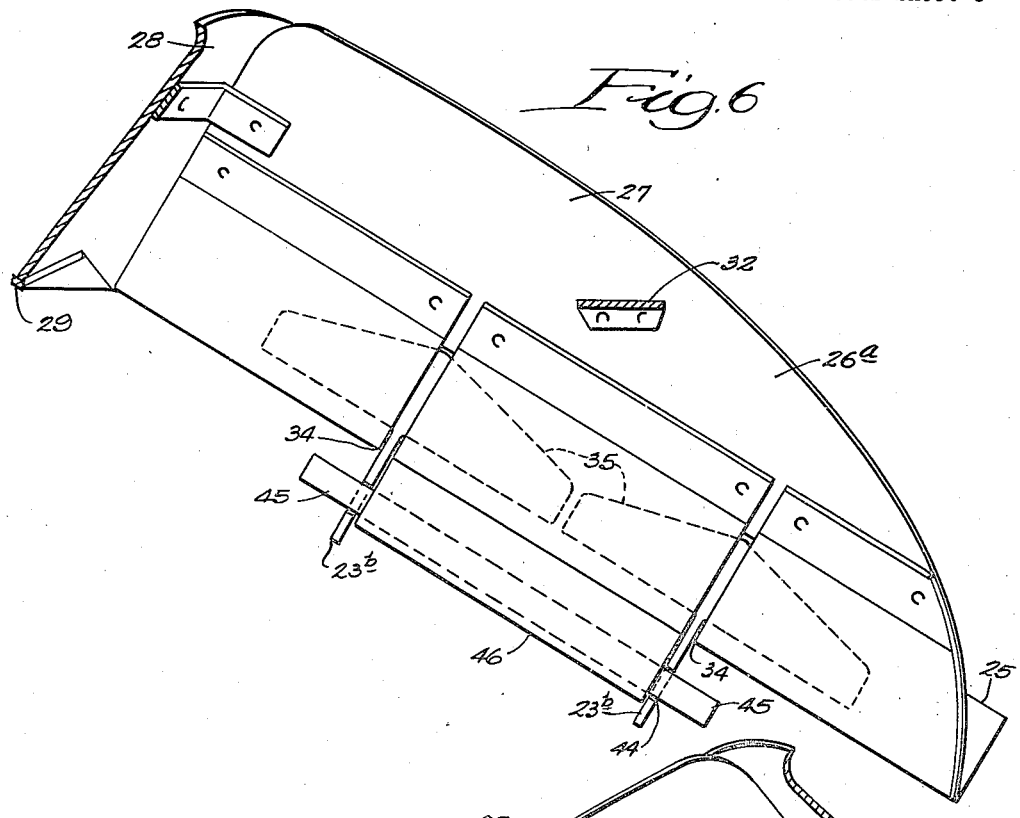
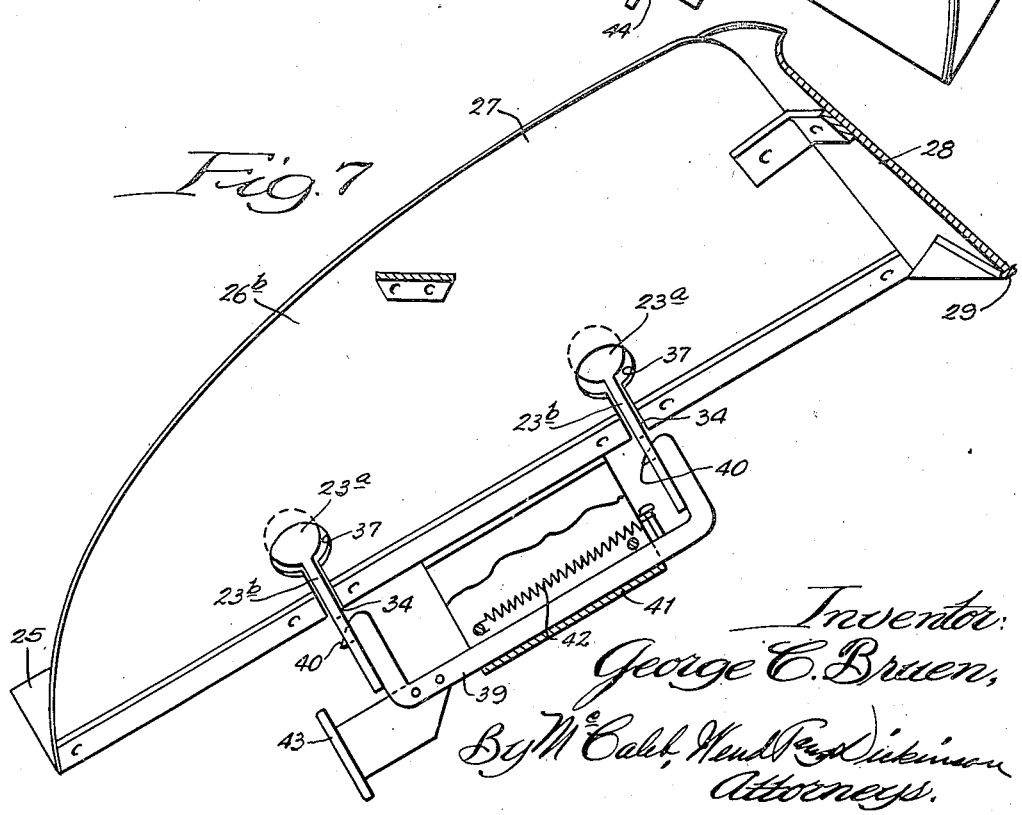
Inventor:
George C. Bruen,
By McCabe, Wendt and Wilkinson
Attorneys.

Feb. 8, 1944.  G. C. BRUEN  2,340,862
CARD FILE
Filed Aug. 8, 1942  6 Sheets-Sheet 4
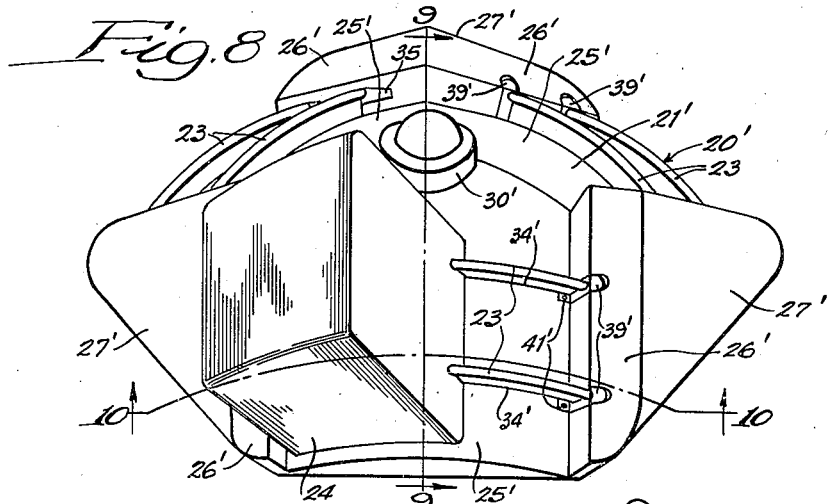
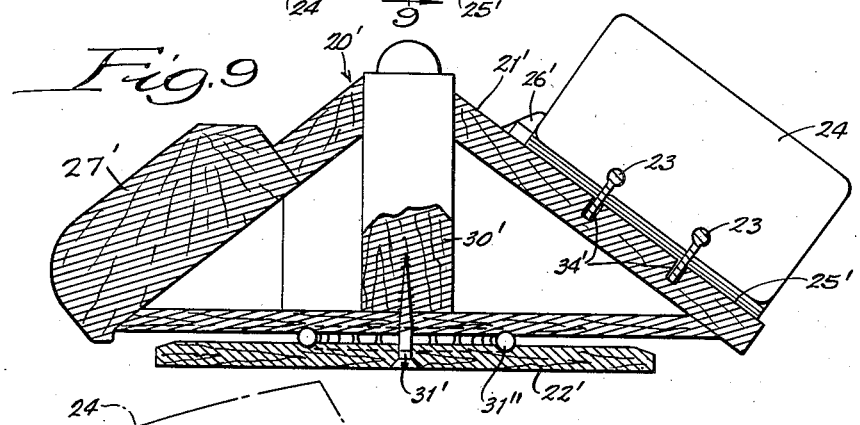
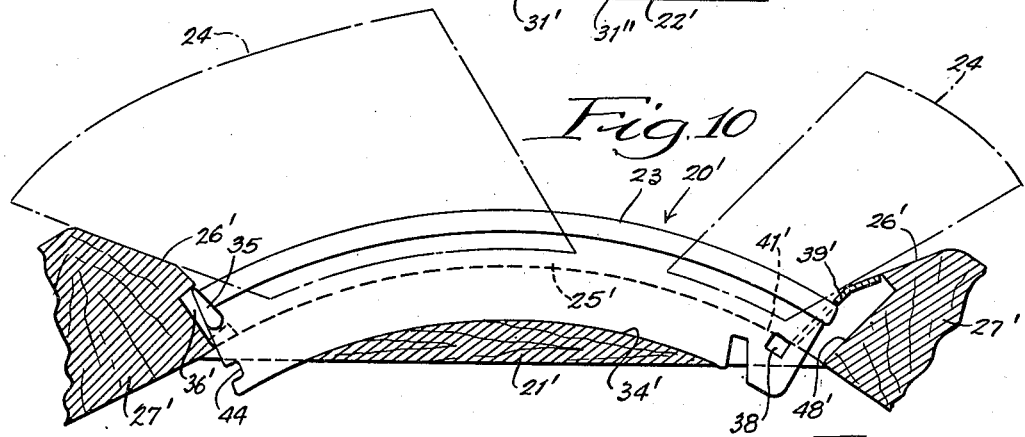
Inventor:
George C. Bruen,
By McCaleb, Hendt and Dickinson
Attorneys.

Feb. 8, 1944.　　　G. C. BRUEN　　　2,340,862
CARD FILE
Filed Aug. 8, 1942　　　6 Sheets-Sheet 5
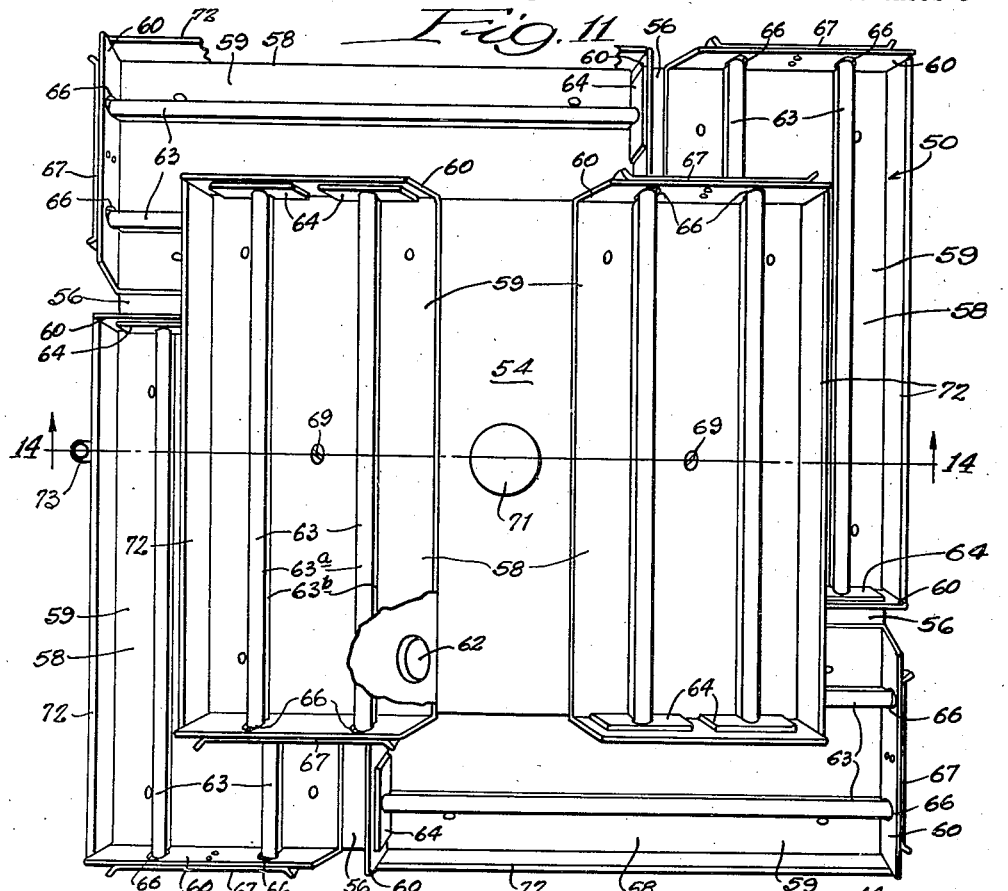
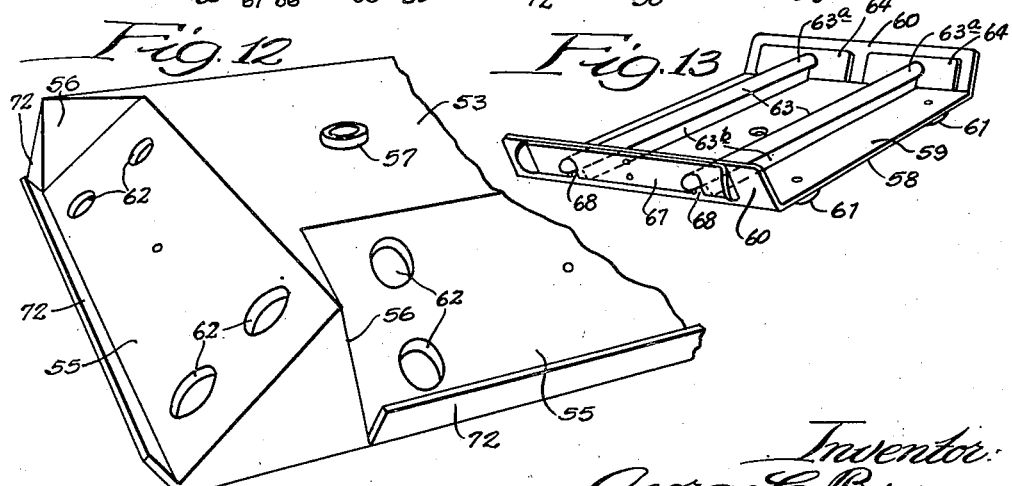

Feb. 8, 1944.    G. C. BRUEN    2,340,862
CARD FILE
Filed Aug. 8, 1942    6 Sheets-Sheet 6
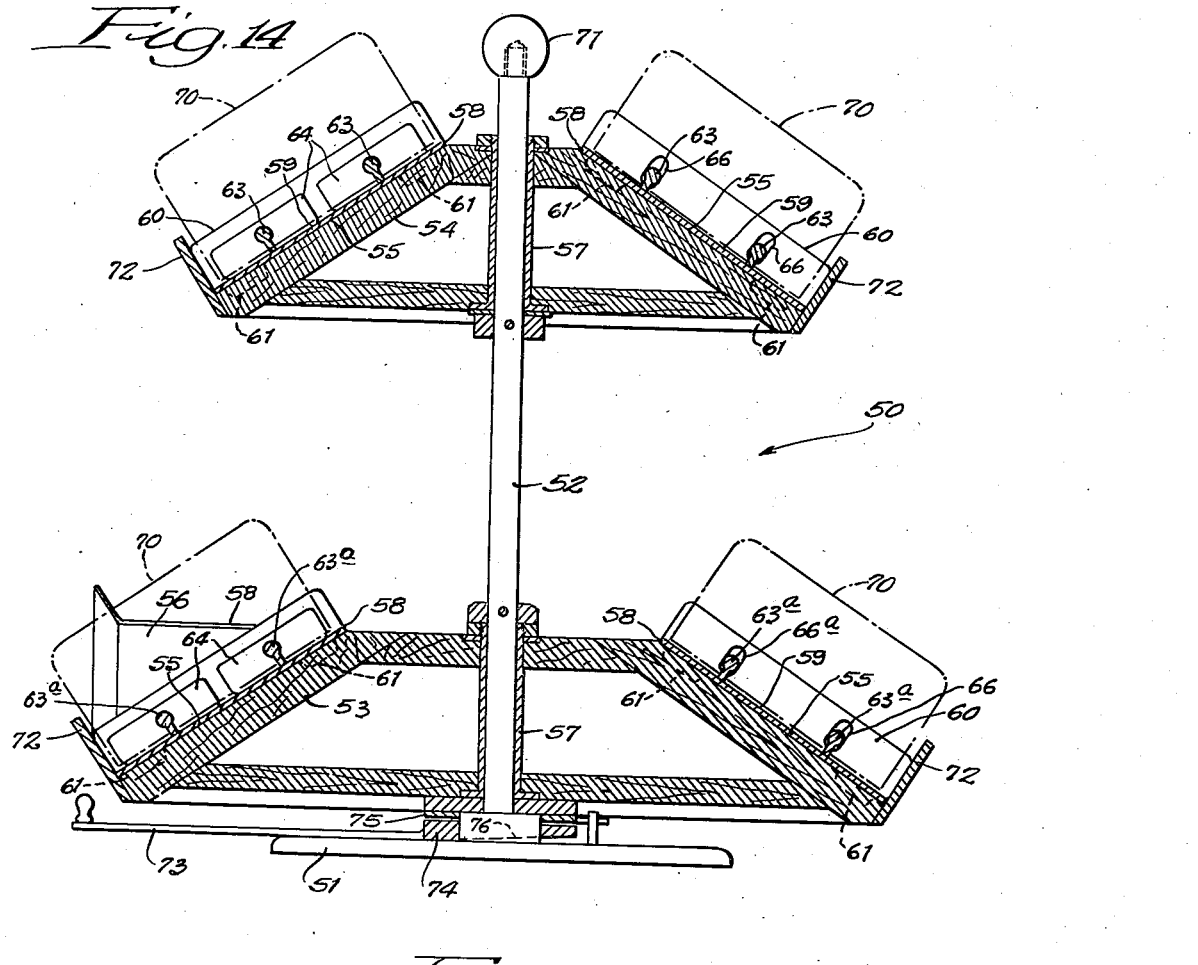
Inventor:
George C. Bruen,
By McCaleb Hendley Dickinson
Attorneys.

Patented Feb. 8, 1944

UNITED STATES PATENT OFFICE 2,340,862

CARD FILE

George C. Bruen, Chicago, Ill., assignor, by mesne assignments, of thirty-five and one-half per cent to himself, thirty-five per cent to Sophie E. Bruen, Chicago, Ill., five per cent to Edna V. Dickinson, Highland Park, Ill., nine per cent to Sarah M. Bullock, Wilmette, Ill., ten and one-half per cent to G. A. Stuart, Washington, D. C., two per cent to Jay Fisher, Chicago, Ill., one per cent to Marie Thoenen, Elmwood Park, Ill., one per cent to George H. Fredericksen, Chicago, Ill., and one per cent to E. M. Thorsen, St. Joseph, Mo.

Application August 8, 1942, Serial No. 454,093

19 Claims. (Cl. 129—16)

My invention relates to card files, and it provides a card record file in which several blocks of cards, supported at their bottom edges on trays or rails whereby the cards may be opened bookwise for inspection or entry, are arranged about and mounted upon a vertically journaled frame which can be turned about to bring successive blocks of cards into positions most convenient for consultation. Preferably my file is made to set on a desk or table.

My invention makes possible the incorporation in a single card file of a number of desirable features:

Each block or section of cards, when consulted, is brought into an optimum position relative to the operator. The block of cards being consulted squarely faces the operator's eyes and at the most convenient position and distance for reading the cards and for writing on them.

Each block of cards is tilted in much the same way that books are tilted for more convenient reading and writing.

The file has a large card capacity in relation to its overall size. Additional card capacity may be had by adding an upper deck of blocks of cards without impairing the visibility of those in the primary or lower deck.

Each block or section of cards may separately be removed from the file frame along with card-mounting or card-supporting structure which serves to keep the cards together in their block. This removal may be for the purpose of more intensive work on them by another operator, or for the substitution upon the file of another block of cards, for a re-arrangement of the cards, or for temporarily exhibiting the cards to a superior at another desk to save the superior the inconvenience of coming to the file.

Yet, without removing the block from the file, cards may readily be removed from the block and returned thereto either individually or in groups. This may be done for the purpose of making entries on individual cards, exhibiting a card to a superior at a remote desk, adding new cards in their proper places, dropping out old cards, or shifting cards from one block to another.

Without bodily moving the file, it may be made available for consultation and entry, with equal convenience, by two or more operators seated at the same desk or table.

The file may be used for sorting papers, allocating them to appropriate cards, by temporarily inserting the papers between appropriate cards, without danger of the papers falling out as the file is turned or as the cards are consulted.

A conveniently applied brake or stop may, if desired, hold the file against turning while entries are being written on a card in situ.

Operator fatigue is reduced to a minimum because the file may be made to turn very easily, there being no appreciable added resistance to turning by an unbalanced distribution of card load (even when one or two blocks of cards are removed), and because it is not necessary for the operator to move her body or head in inspecting any of the cards (as is the case with the tub files, drawer files, and visible index trays sliding out of cabinets).

While preferably the cards are written to be read bookwise, the same structure may be employed for cards to be read lengthwise, and by turning the frame ahead or back both sides of such cards may be consulted with reasonable convenience whether the top line on each side adjoins the same or opposite edges. This permits cards of these various types to be mixed in my file.

My file may be set on any desk or table and readily removed to another. No special construction of desk or table, or special fittings therefor, are required. The file may readily be carried into a vault or safe for overnight protection of valuable or confidential records.

My file is simple, rugged and inexpensive to manufacture. If circumstances require, it may be made largely of wood and other substitute materials to minimize the amount of metal employed.

The accessibility of each card and the convenient position in which it is presented to the operator for reading or writing, applies to both sides of the cards—equally to the front and back of each card.

The mounting of the rotary file being such that its operation is not impaired by unbalancing, I am able to use cards in one section of size different from that in another section, or to operate the file with cards wholly eliminated from one section, or to mix cards of different sizes together in the same section; and this use of cards of different sizes involves no need for changing the structure of the file.

The foregoing, together with further objects, features and advantages, are set forth in the following description of specific embodiments of my invention, which are illustrated in the accompanying drawings wherein:

Fig. 1 is a plan view of one form of my card file, executed in sheet metal, and showing the cards and card-mounting rails in place;

Fig. 2 is a front elevation thereof;

Fig. 3 is a perspective view of the file of Figs. 1 and 2, but with the cards and mounting rails removed;

Fig. 4 is a vertical section of the file taken along the line 4—4 of Fig. 1;

Fig. 5 is a nearly vertical section along a card mounting rail taken on the line 5—5 of Fig. 1;

Fig. 6 is a vertical radial section of the file of Fig. 1 at one end of a card section, taken along the line 6—6 of Fig. 5;

Fig. 7 is a vertical radial section of the file of Fig. 1 at the other end of a card section, taken along the line 7—7 of Fig. 5;

Fig. 8 is a perspective view of a second form of my file, executed in wood;

Fig. 9 is a diametrical vertical section of the file of Fig. 8, taken on the line 9—9 of Fig. 8;

Fig. 10 is a nearly vertical chordial section of the file of Fig. 8 taken on the line 10—10 of Fig. 8;

Fig. 11 is a plan view of a third form of my file, executed in wood and having four, rather than three, card sections, and additionally two upper card sections;

Fig. 12 is a perspective view of about one half of the file of Fig. 11, with the cards and card trays removed;

Fig. 13 is a perspective view of one of the trays used in the file of Fig. 11;

Fig. 14 is a vertical central cross section of the file taken along line 14—14 of Fig. 11; and Fig. 15 is a longitudinal vertical section through the tray of Fig. 13;

The form of card file 20 illustrated in Figs. 1 to 7 comprises a rotating body or frame 21 vertically journaled upon a stationary base 22 which is adapted to be set upon and rest upon the top of a table, desk, counter, or the like.

In this form there are three blocks or sections of cards 24 arranged in trianguloid pattern at the margins of the frame 21. The cards of each section are mounted upon a pair of parallel rails 23 carried by the frame. Each rail comprises a longitudinal head 23a, received in one of the two keyhole shaped slots 24a leading inwardly from the bottom of each card, and a flat flange 23b depending from the head. The rails here shown are arcuate as viewed in side elevation, and in fact may be rails identical with, and therefore freely interchangeable with, those shown in my Patent No. 2,235,736. (This enables blocks of cards together with the mounting rails to be removed from the wheel type of index shown in that patent and applied to this file, without necessity of removing the cards from the rails.)

The frame 21, here shown as formed of sheet metal, includes seats for receiving each of the three card sections, the floor 25 of each card section seat also being arcuate concentrically with the rails. These seats, as viewed in cross section radial to the file and as best shown in Fig. 4, are tilted or inclined to an angle of say 35 or 40° to the horizontal.

As best shown in Fig. 5, the frame is formed to provide end walls 26a at the left and 26b at the right ends of the card section floors 25. These end walls 26a and 26b are turned outwardly beyond right angles to the floor 25 and may conveniently be formed as flange-like continuations of the piece which forms the floor 25. In fact, the flange-like continuation forming the end walls 26a and 26b are preferably extended into wings 27 intersecting at radial ridges 28, thereby serving the dual function of inclined end rests for the cards of each section and filling in the arcuate gaps between the card section seats 25. The inner edges of the card section seats or floors 25 are joined to a trianguloid horizontal web 29 to fill in the center.

The rotating frame 21 carries a central hub 30 whereby it is vertically journaled upon the fixed arbor or axle 31 which upstands from the base 22. In addition to its bearing upon the arbor 31, the hub 30 may have an anti-friction thrust bearing upon the base 22. The structure of the sheet metal frame 21 is reenforced by chordial interwing braces 32 and by radial braces 33 extending between the mid-points of the inter-wing braces 32 and the hub 30.

The rails 23 are removably mounted in their card section floors or seats 25. Each floor 25 has a pair of slots 34 cut therethrough and extending the length thereof through which the flanges 23b of the rails are set. Each rail carries at one end (the left end as here shown) an integral wing-like transverse stop 35 to keep the cards from running off the rail when the rail is removed with the cards thereon. When the rails are mounted on the frame 21, their stops 35 are received in pockets 36 at the end walls 26a as best shown in Figs. 1 and 5. This anchors the stop end of each rail against upward movement.

The right-hand end walls 26b have holes 37, constituting terminals for the slots 34, into which the adjacent end of the rail heads 23a extend. Upward movement of the right-hand or unstopped ends of the rails of each pair of rails is prevented by a latch 39 as best shown in Fig. 7, mounted on the underside of the floor 25 and simultaneously locking both rails of the pair.

Near its latched end, the flange of each rail is provided with a latch-hole 38 into which the latching tongues 40 of the U-shaped bar latch 39 protrude. The U-shaped bar of the latch 39 is slidingly mounted in a bracket 41 fixed to the underside of the floor 25.

The latch 39 is held in normal latching position by a spring 42 interposed between the bracket and latch, but the latch may be released to free the ends of the two rails, by latching under the margin of the frame 21 and pushing on a finger button 43 carried by the latch.

The left or stop end of each rail is further positioned by means of a slot 44 at the adjoining end edge of the rail flange, which slot receives a fixed transverse pin 45 mounted by a bracket 46 on the underside of the floor 25.

Thus, each pair of rails, with or without a block of cards mounted thereon, is readily and conveniently insertable into the card section seat of the frame by dropping the left-hand ends of the rail flanges 23b into the slots 34 in the floor, and, while holding the rails more or less horizontal, sliding them endwise until the pin 45 engages in the end slots 44 and the end stops 35 engage in their seat 36. Then the opposite ends of the rails are pushed down so that the ends of their rail heads enter the terminal holes 37 and the latch 39, which is yielded against the pull of the spring 42, engages its latch tongues 40 in the latch holes 38 of the rail flanges.

The cards are preferably so printed and ruled that they will be read transversely with the same short edge constituting the top for both sides of the card. Thus, the cards are like the leaves of a book and the block of cards may be consulted bookwise. As in the instance of a book, the inclined position given to the block of cards by virtue of the inclination of the card section seats or floors 25, lends greater convenience both for visibility and for writing upon the cards in situ. The cards, when opened up to be written upon, are so close to the table top that the table top may form a convenient arm rest for the operator in writing.

The frame 21 is easily rotated to the position which will bring the card to be consulted nearest the operator, and when the card is so positioned, it will be at an optimum distance from the operator and can more or less squarely face the operator's eyes. Similarly, the same optimum position is realized for each card upon which entries are to be written while the card is in the file.

While the file is really trianguloid, its over-all conformation in plan closely approximates a circle and the over-all height is comparatively low. As a result, a large number of cards may be made quickly available to the operator, with each card as consulted coming at a most favorable position, despite the rather small over-all diameter and height of the card file.

The file may be carried by the ball knob 47 at the upper end of the axle 31.

One or more sections of cards may be removed from the file by removing the pair of rails together with the cards thereon. This sub-assembly of combined cards and rails may be substituted in another similar file or in a rotary file of the type shown in my above-mentioned patent, or they may be set in a suitable desk tray, such as shown in my Patent No. 2,240,325, for more concentrated inspection or rearrangement by another operator at another desk. Thus, at certain times when it is convenient to subdivide the file among two or three operators, this may be done by removing the sections of cards together with their rails.

When cards, together with the rails which mount them, are removed together from the file, the sub-assembly is carried by engaging the unstopped ends of the rails, the stops at the other ends of the rails keeping the cards from running off.

Alternatively, a large or small group of cards may be removed en masse from the file without removing the entire section or the rails from the file. This may be done by unlatching the unstopped ends of the rails and lifting them up enough to permit cards to be passed en masse off the ends of the rails.

Individual cards, or two or three cards at a time, may be removed without exposing the ends of the rails. This may be done by flexing the cards off the rails, the margins of their keyhole slots flexing to permit this removal. This is a convenient way for cards to be removed for entries on a typewriter or by free-hand entries made with the card resting flat on a desk top, or for taking an individual card to a remote point for inspection, or for adding cards to or subtracting cards from the file, or for rearranging their order.

Operator-fatigue in my file is very small because the operator is not required continuously throughout the course of the day in working intensively on the cards, to exert very much of a pull to turn the frame to consult various cards, nor is it necessary for her to shift her body or turn her head in reaching a favorable position for the consultation of any card. Instead, each card to be consulted is brought to the most favorable position relative to the operator.

Occasionally it is expedient to include in such a file previously written existing record cards which have been printed and ruled to be read lengthwise. Ordinarily such cards would be difficult to read if they were placed in a file which was intended to be consulted in a bookwise fashion. But in my file, because of the inclined peripheral arrangement of the cards upon the rotary frame, it is not prohibitively inconvenient to consult cards written to be read lengthwise and hence it is feasible to include them along with transversely written cards in this file, thereby saving the cost of rewriting such cards. When such a card is to be consulted, the operator can readily turn the frame so that the card lies about ninety degrees from a radius from the axis of the file to the operator's eyes, instead of to a position more nearly along such a radius as is more convenient for the inspection of cards written to be consulted bookwise.

Referring to the form of Figs. 8 to 10, I have shown a similar file 20' built largely of wood or other non-metallic material. Here the rotating frame 21' is vertically journaled upon a stationary base 22' which may rest on a table top. The rails 23, which may be of a plastic rather than metal, support the cards 24 in the manner previously described. The floor or seat 25' for each card section is similarly arcuate and is bounded at its ends by inclined end walls 26', which facilitates the cards being opened bookwise for inspection.

The arcuate gaps between sections are closed by intersection blocks 27' built into the frame, the radial edges of which present the end walls 26'. The frame includes a central post 30'. A headed central screw or pivot pin 31' fixed in the post 30 and extending with an easy fit through the base 22', centers the frame upon the base while permitting it to turn thereon, and the head of the screw or pivot pin causes the base to be lifted when the file is lifted by the frame to be moved to another location. Friction in turning the frame upon the base may be minimized by a series of metallic balls 31'' working in registering grooves in the opposed faces of the base 22' and the bottom of the frame.

Rail slots 34' are cut in the card section floor 25' to receive the rail flanges. The stop 35 at one end of each rail is received in a pocket 36' in one of the end walls 26'. The other end of each rail is releasably secured by a spring latch 39' which has a keyhole shaped slot extending upwardly from its lower end to receive the head and flange of the rail and which is secured to the floor 25' by an anchoring flange 41'.

Each rail is romovable by flexing its associated spring latch 39' back into a recess 48' in the associated end wall 26', so that the latch no longer overhangs the end of the rail head, and that end of the rail may then be lifted up and the rail pulled out of the slot 34'. When the rail is inserted in the slot, the stop 35 is first engaged in its pocket 36' and then the other end of the rail is pushed downwardly, camming the spring latch 39' into its recess 48' until the spring snaps over the end of the rail head.

As in the other forms illustrated, gravity acting on the rails and the cards they carry, tends to hold the rails in their latched seated positions and therefore the latch mechanism does not have to be so rugged nor so fool-proof as in the instance of a card wheel where the weight of the cards and rail must hang in part upon the latching mechanism as the wheel rotates.

The several wooden pieces, of which the frame is indicated as being formed, are readily formed on woodworking machines and readily assembled by screws, nails or gluing, whereby the file may be made at low cost and largely of non-metallic materials. Yet, like the form shown in Figs. 1 to 7, the file presents a sightly appearance and is compact in relation to the number of cards it will hold for uniformly convenient inspection.

Referring to Figs. 11 to 15, the third form of my file here illustrated differs from the other two forms chiefly in the use of four card sections arranged as a square, rather than three arranged as a triangle, and in the optional inclusion of an upper deck here shown as containing two more sections. Also in this form the card supporting rails are shown as straight rather than arcuate and rather than being mounted directly on the rotating frame, they are removably mounted in trays which in turn are removably mounted on the frame so that each section of cards, together with its rails and its own tray, may be removed to rest directly on a desk top for more intensive consultation or rearrangement by the same or another operator or for consultation by some superior at a remote desk.

In this form of file, indicated generally at 50, the base 51, which is adapted to rest on a table top or the like, fixedly carries an upstanding axle or arbor 52. The lower deck frame 53 here shown as made of several pieces of wood suitably bent together, is generally square. If desired, a somewhat similar frame 54 may also be rotatably mounted on the arbor 52 at a higher level and preferably, although not necessarily, the upper deck frame 54, while generally square, is of smaller dimension and contains only two trays. This permits the upper deck frame to be set down near the lower deck frame without obscuring the vision of cards in the lower deck. I contemplate, however, that the lower deck frame may be designed to carry more or less than the four trays shown and that the upper deck may carry the same number or lesser number of trays than the lower deck.

The square lower deck frame 53 as shown carries, adjoining its respective margins, a set of four tray seats 55 so arranged that one end portion of each seat overlaps—extends past—the end of an adjoining seat as indicated in Fig. 12. Each of the seats 55, as seen in Figs. 11 and 12, is in plan, parallel with the seat on the diametrically opposite side of the frame and at right angles to the two adjoining seats. Each seat is laterally tilted to an angle in the order of thirty-five degrees to the horizontal so that it slopes downwardly and outwardly.

The deck frame 53 is formed to present, at that end of each seat 55 which is overlapped by the end portion of the adjoining seat, an end wall 56 which is inclined upwardly and longitudinally away from the seat 55; there is no end wall for the other end of each seat 55.

The four seats 55 of the lower deck would themselves form a hollow square; but, as here shown, the hollow of the square is closed by top and bottom webs or plates vertically interconnected by a hub 57 journaled on the arbor 52, whereby the lower deck frame 53 may freely rotate thereabout.

A card tray 58 is set upon each seat 55. Each tray 58, which may be formed of sheet metal or a suitable sheet of hard fiber board, comprises—referring to Fig. 13—a floor 59, upwardly and outwardly inclined short end walls 60 (agreeable to the inclination of the end walls 56 of the seats 55), and feet 61 here shown as four in number.

Depressions 62, corresponding in number and spacing to the feet 61 of the trays, are formed in each seat 55 as best shown in Fig. 12. When a tray 58 is set upon the seat 55, the feet are received in the depressions 62 to anchor the tray against shifting in the seat. When the trays are removed from the file and set upon a desk top, the feet—being of a resilient or cushioning non-skid material, hold the tray against sliding upon the desk top or injuring its finish.

Each tray 58 is equipped with a pair of spaced parallel rails 62. In the form here shown, the tray floor is flat and the rail straight rather than being arcuate as in the two forms first described.

Each rail comprises a head 63a extending along its length and a depending flange 63b. The depending flange 63b is considerably shorter than in the rails shown in the other forms since here they extend only to the tray floor 59, instead of extending on down through floor slots.

Each rail carriers at one end a wing-like stop 64. The tray end 60 which adjoins the stop end of the rail is provided, as shown in Fig. 15, with a hole 65 to receive the end of the rail head 63a which protrudes beyond the stop 64 thereby anchoring that end of the rail.

The other end of each rail head 63a is received in a slot 66 in the other end 60 of the tray, and is further engaged by a leaf spring latch 67 centrally pivoted to the outer side of the adjoining end wall 60. Near each of its ends the latch 67 is provided with a downwardly opening rail-engaging slot 68 which enables the latch 67 to straddle the rail head adjoining its end.

The remove the rails, the offset outer ends of the resilient latch 67 are flexed away from the adjoining end walls 60 of the plate sufficient to clear the end of the rail head and permit that end of the rail head to be rocked upwardly through the slot 66 and clear that end of the tray, the other end of the rail head still protruding through the hole 65 in the other end of the tray to act as a fulcrum or pivot until the rail is tilted sufficiently to permit the protruding end of the rail head to be withdrawn from the hole 65.

The rails may thus be removed from or mounted in the trays either with cards mounted on the two rails of the pair or without cards. And this may be done either when the tray is mounted in its seat upon the deck frame, or when the tray is removed therefrom and, for example, resting directly on the desk top. Also, by merely rocking the latched ends of the rails up an inch or so from their latched position, the ends of the rails may be exposed for sliding cards en masse onto or off from the rails over the ends thereof without wholly removing the rails from the tray or even withdrawing the protruding ends of the rail heads from the hole 65 in the end wall of the tray.

Because the weight of the cards and of the rails and trays at all times tends to urge the tray down upon its seats 55, it is not ordinarily necessary to fix the trays to the seats other than the engagement of the feet 61 in the depression 62 which prevents shifting. But if a more permanent attachment is desired which will positively preclude the trays being casually lifted from their seats, screws 69 with countersunk heads may be passed through holes in the middle of the tray floor 59 and into the seats 55.

A block or section of cards indicated at 70, it will be understood, is set in each tray 58 and mounted therein by virtue of a pair of spaced, keyhole shaped slots opening from their lower edges and receiving the respective rails of the pair of rails mounted in the tray.

Where an upper deck frame 54 is employed in order that the over-all height of the file may be reduced and the cards in the upper deck be brought to a lower position for more convenient inspection without obscuring vision and ready access to the cards in the lower deck frame, I prefer to make the upper deck frame 54 smaller in its over-all horizontal dimension. This is preferably accomplished by providing only two tray seats 55 in the upper deck frame and arranging them at a much closer radius to the vertical axis. As a result, as best seen in Fig. 11, the upper deck is more or less square in plan, but of considerably lesser horizontal dimension than the lower deck, giving the file as a whole somewhat pyramidical shape.

While the upper deck frame may be interconnected with the lower deck frame to rotate therewith, I prefer that each rotate independently on the arbor 52.

The entire file may be lifted and carried to another desk or table by means of the handle knob 71 at the top of the arbor 52. By unscrewing the ball knob 71, the entire upper deck, together with its tray, rails and cards, can be lifted from the remainder of the file and carried as a sub-assembly to be set upon a desk for inspection by another operator.

If only the lower deck frame is to be employed, the arbor 52 will of course be correspondingly shorter. The horizontally lapping arrangement of the four trays on the lower deck frame, as viewed in plan in Fig. 11, is particularly desirable where four trays are employed on a deck. The inner side of each tray adjoining one end of the tray, laps and opposes the near end of an adjoining tray.

When the cards on a tray are opened up with a V-shaped gap for inspection—that is, when the cards are manipulated like the leaves of a book—the cards at one of the tray, being inclined longitudinally of the tray, extend out beyond the tray into space without vertically overlapping anything other than the desk top. But the cards at the other end, correspondingly inclined in the opposite longitudinal direction, extend out beyond the tray end to vertically lap the near side edge of the other adjoining tray. However, this does not interfere with the cards in that adjoining tray because of the fact that that adjoining tray seat is tilted outwardly to a substantially corresponding angle. Thereby the adjacent inclined end cards in the one tray are substantially parallel to, but slightly spaced from, the near side edges of the cards in the end portion of that adjoining tray. Hence the cards in the one tray do not interfere with the cards in either of the adjoining trays.

It will thus be seen that this overlapping square arrangement of four trays upon a deck frame, in conjunction with the transverse tilting of the trays, involves a peculiar co-relation of the parts affording an unusual compactness and interfitting of the blocks of cards without interference.

While I prefer, when using straight rails, to employ trays—and especially removable trays—I contemplate that the trays may be dispensed with and the rails mounted directly upon the deck frame, which can be accomplished, for example, by making the depending flanges of the rails deeper and setting them directly into the slots in the seats 55 after the fashion of the arcuate rails shown in the form of Figs. 8 to 10.

Another feature of my file is that it readily adapts itself to be used as a sorting device for slips of paper. This is especially true of slips of paper bearing data which are to be entered upon the respective cards. Each slip of paper is inserted between two cards, one of which is the card onto which its data are to be entered. The operator, with a group of such papers in hand, may readily turn the file to locate the pertinent card and drop the slip between that card and an adjoining card, repeating this process until all of the slips are filed. Then the operator may go through the cards in more or less consecutive order to make the required entries.

When the file is to be used extensively for this sorting purpose, a ledge or low upstanding wall is preferably provided along the bottom edge of each seat. While this ledge can be incorporated in any of the forms shown, I have illustrated it only in connection with the form of Figs. 11 to 15 where it is identified as 72.

This ledge extends a little farther above the floor for the cards than do the tops of the rails, so that it will engage the end edges of slips of paper inserted between cards and resting on the rail heads. This prevents the inserted slips, which are not interlocked with the rails, from working downwardly and outwardly either through gravity or the mild centrifugal force of rotation of the file.

Where the file is to be used in situations where it is more expedient to write entries upon the cards in situ, on the file, rather than removing an individual card and setting it on the desk top for writing the entry thereon, it is of advantage to hold the file against rotating. Sometimes this can be done with the other hand, but if it will be desirable to have the other hand free for manipulating the cards or handling other papers more or less simultaneously with the writing of entries upon the cards, I prefer to incorporate in the file a brake whereby the file may readily be held temporarily against rotation. While such a brake is applicable to all forms shown, I have illustrated it only in connection with Fig. 14.

Here a horizontal brake arm 73 extends radially out from between the base 51 and the lower deck frame 53 for convenient engagement radially beyond the file but closely adjacent the desk top. The inner end of the brake arm 73 is fixed to a ring 74, the upper face of which is flat for frictional engagement with a mating ring 75 carried by the underside of the deck frame 53. Both rings 74 and 75 are concentric with the axis of the file and surround the lower end of the arbor 52.

The under side of the ring 74 is helically cammed and cooperates with the upwardly facing complementary cammed face 76 of the base 51. When the exposed end of the brake arm 73 is swung a few degrees, the cam faces cooperate to lift the ring 74 into frictional engagement with the ring 75 of the lower deck frame, thereby frictionally locking it against rotation and permitting considerable pressure in writing upon the cards without turning the file.

While I have thus described and illustrated these specific embodiments of my invention, I contemplate that many changes and substitutions may be made therein without departing from the scope or spirit of my invention.

I claim:

1. A card file comprising a supporting base, a deck rotatably mounted on the base for rotation about a vertical axis, a set of card mounting structures carried by the deck and arranged along its margin and polygonally about its axis, each card mounting structure being adapted to mount upon the deck a block of cards with the block extending transversely to a radius from the axis and transversely tilted outwardly, the cards being engaged by the card mounting structure to swing about their bottom edges, whereby they will open up bookwise for inspection of both sides of the cards.

2. A card file according to claim 1 wherein there are three such card mounting structures uniformly arranged about the deck.

3. A card file according to claim 1 wherein each card mounting structure comprises a card block seat, and a pair of parallel transversely spaced rails carried by the seat and having heads adapted to be received in key-hole slots in the bottom edges of the cards.

4. A card file according to claim 1 wherein some of each card-mounting structure is removable from the deck with its block of cards thereon and retained as a group by the removed structure.

5. A card file according to claim 1 wherein each card mounting structure includes a tray containing a block of cards and removable from the deck with the cards therein.

6. A card file according to claim 1 wherein each card mounting structure includes a pair of rails received into slots in the margin of the cards to retain them and removably mounted on the deck, whereby the pair of rails, with the associated block of cards still mounted thereon, may be removed from the deck.

7. A card file according to claim 1 wherein each card-mounting structure is arcuately conformed to give its block of cards a corresponding arcuate conformation bulging upwardly and outwardly at its middle.

8. A card file according to claim 1 wherein each card-mounting structure includes a pair of laterally spaced parallel arcuate rails received into slots in an agreeably arcuate floor and removably retained therein, and the rails are headed for reception into key-hole slots in the base edges of the cards whereby to mount them on the rails.

9. A card file according to claim 1 wherein the deck is square, there are four card-mounting structures, and the inside lateral edge of each card mounting structure near one of its ends overlaps the end edge of an adjoining structure.

10. A card file according to claim 1 wherein, as regards rotation of the deck in a given direction, the trailing end of each card-mounting structure is overlapped by the inside lateral edge of the leading end of the trailingly adjoining card-mounting structure.

11. A card file according to claim 1 wherein an upper deck, carrying a plurality of card-mounting structures for a plurality of blocks of cards, is spaced above the first mentioned deck and mounted for rotation about a concentric axis.

12. A card file according to claim 1 wherein each card-mounting structure comprises a pair of laterally spaced parallel rails having heads for engaging in key-hole slots in the bottom margins of the cards and depending flanges removably set into slots in the floor of a card seat, and means for releasably retaining the rails in the deck including a latch member mounted to slide transversely of the rails and having a pair of similarly directed spaced latch tongues to enter slots in the flanges of the respective rails of the pair, and spring means urging the latch into rail-retaining position, the latch being presented for manual engagement to slide it against urging of the spring for releasing the latch from the rails.

13. A card file according to claim 1 including a brake for restraining the deck from rotating while its cards are being written upon or inspected, and a handle presented for convenient manual engagement for controlling the application and release of the brake.

14. A card file according to claim 1 including a brake for restraining the deck from rotating while its cards are being written upon or inspected, and a handle presented for convenient manual engagement for controlling the application and release of the brake, the brake acting between the base and deck and including braking surfaces concentric with the axis of rotation.

15. A card file according to claim 1 wherein each card-mounting structure includes a tray containing the cards and has projection means depending into depression means in the deck for retaining the tray against shifting upon the deck, the projection means forming table-engaging supports for the tray when removed, along with the cards therein, from the deck and set upon a table top.

16. A card file according to claim 1 wherein each card-mounting structure has associated therewith a ledge extending along its outer lateral margin to act as a stop for the lower ends of slips of paper dropped between cards for sorting slips.

17. A card file according to claim 1 wherein each card-mounting structure includes upwardly and divergently inclined end walls for supporting the end cards in divergent oblique positions, whereby to facilitate the block of cards opening up into a V-shaped gap to expose the opposed faces of adjoining cards.

18. A card file according to claim 1 wherein the base is adapted to rest upon a table top and the deck supports the cards sufficiently close to the table top upon which the base is rested to enable an operator to write upon the cards while resting the wrist upon the table top.

19. A card file comprising a base, a deck rotatably mounted on the base for rotation about a vertical axis, a set of card mounting structures carried by the deck and arranged about the margin thereof, each structure mounting a block of cards with the block extending lengthwise of the structure and crosswise of a radius from the axis, and with each individual card in a generally vertical plane transverse to the margin of the deck and to the length of the mounting structure and supported to swing about an axis adjacent and parallel to the bottom edge.

GEORGE C. BRUEN.